(12) United States Patent
Mortimer et al.

(10) Patent No.: US 8,744,952 B2
(45) Date of Patent: Jun. 3, 2014

(54) METHOD AND APPARATUS FOR IMPROVED ELECTRONIC TRADING

(75) Inventors: David Walter Mortimer, Carversville, PA (US); Scott Charles Larison, Marlton, NJ (US)

(73) Assignee: ITG Software Solutions, Inc., Culver City, CA (US)

( * ) Notice: Subject to any disclaimer, the term of this patent is extended or adjusted under 35 U.S.C. 154(b) by 1143 days.

(21) Appl. No.: 12/285,394

(22) Filed: Oct. 3, 2008

(65) Prior Publication Data

US 2009/0094151 A1    Apr. 9, 2009

Related U.S. Application Data

(60) Provisional application No. 60/977,710, filed on Oct. 5, 2007.

(51) Int. Cl.
G06Q 40/04 (2012.01)
(52) U.S. Cl.
CPC ..................................... G06Q 40/04 (2013.01)
USPC .......................................................... 705/37
(58) Field of Classification Search
CPC ..................................................... G06Q 40/04
See application file for complete search history.

(56) References Cited

U.S. PATENT DOCUMENTS

| | | | |
|---|---|---|---|
| 3,648,270 A | 3/1972 | Metz et al. | |
| 5,101,353 A | 3/1992 | Lupien et al. | |
| 5,136,501 A | 8/1992 | Silverman et al. | |
| 5,255,309 A | 10/1993 | Katz | |
| 5,689,652 A | 11/1997 | Lupien et al. | |
| 5,717,989 A | 2/1998 | Tozzoli et al. | |
| 5,724,524 A | 3/1998 | Hunt et al. | |
| 5,724,525 A | 3/1998 | Beyers, II et al. | |
| 5,794,207 A | 8/1998 | Walker et al. | |
| 5,802,499 A | 9/1998 | Sampson et al. | |
| 5,806,044 A | 9/1998 | Powell | |
| 5,812,988 A | 9/1998 | Sandretto | |
| 5,842,178 A | 11/1998 | Giovannoli | |
| 5,845,266 A | 12/1998 | Lupien et al. | |
| 5,873,071 A | 2/1999 | Ferstenberg et al. | |
| 5,905,975 A | 5/1999 | Ausubel | |
| 5,924,082 A | 7/1999 | Silverman et al. | |

(Continued)

FOREIGN PATENT DOCUMENTS

AU    2005220858 A1    9/2005
EP       1939731 A1    7/2008

(Continued)

OTHER PUBLICATIONS

Madden, Bartley J., "Structural Changes in Trading Stocks," The Journal of Portfolio Management, Fall 1993, pp. 19-27.

(Continued)

*Primary Examiner* — Bruce I Ebersman
(74) *Attorney, Agent, or Firm* — Rothwell, Figg, Ernst & Manbeck, P.C.

(57) ABSTRACT

A method and apparatus for outputting data that represents the change in value of an options premium that would have resulted if the options traded in a direct linear volume relationship with its underlying security is provided. Input values utilized include a delta value, a gamma value, a value-weighted average price of an underlying stock, a reference price of the underlying stock, and an original order premium value.

16 Claims, 5 Drawing Sheets

(56) References Cited

U.S. PATENT DOCUMENTS

| | | | |
|---|---|---|---|
| 5,950,177 A | 9/1999 | Lupien et al. | |
| 6,151,588 A | 11/2000 | Tozzoli et al. | |
| 6,211,880 B1 | 4/2001 | Impink, Jr. | |
| 6,236,979 B1 | 5/2001 | Kawabata | |
| 6,255,309 B1 | 7/2001 | Pees et al. | |
| 6,260,025 B1 | 7/2001 | Silverman et al. | |
| 6,282,521 B1 | 8/2001 | Howorka | |
| 6,285,983 B1 | 9/2001 | Jenkins | |
| 6,285,984 B1 | 9/2001 | Speicher | |
| 6,304,858 B1 | 10/2001 | Mosler et al. | |
| 6,317,727 B1 | 11/2001 | May | |
| 6,317,728 B1 | 11/2001 | Kane | |
| 6,321,205 B1 | 11/2001 | Eder | |
| 6,321,212 B1 | 11/2001 | Lange | |
| 6,343,278 B1 | 1/2002 | Jain et al. | |
| 6,408,282 B1 | 6/2002 | Buist | |
| 6,421,653 B1 | 7/2002 | May | |
| 6,578,014 B1 | 6/2003 | Murcko, Jr. | |
| 6,594,643 B1 | 7/2003 | Freeny, Jr. | |
| 6,622,131 B1 | 9/2003 | Brown et al. | |
| 6,766,304 B2 | 7/2004 | Kemp, II et al. | |
| 6,772,132 B1 | 8/2004 | Kemp, II et al. | |
| 6,912,510 B1 | 6/2005 | Shepherd | |
| 6,938,011 B1 | 8/2005 | Kemp, II et al. | |
| 6,985,883 B1 | 1/2006 | Togher et al. | |
| 7,003,486 B1 | 2/2006 | Condamoor et al. | |
| 7,035,819 B1 | 4/2006 | Gianakouros et al. | |
| 7,099,839 B2 | 8/2006 | Madoff et al. | |
| 7,110,974 B1 | 9/2006 | Rust | |
| 7,130,823 B1 | 10/2006 | Rayner et al. | |
| 7,136,834 B1 | 11/2006 | Merrin et al. | |
| 7,152,041 B2* | 12/2006 | Salavadori et al. | 705/36 R |
| 7,152,042 B1 | 12/2006 | Arkes | |
| 7,162,447 B1 | 1/2007 | Cushing | |
| 7,162,448 B2 | 1/2007 | Madoff et al. | |
| 7,165,045 B1 | 1/2007 | Kim-E | |
| 7,308,428 B1 | 12/2007 | Federspiel et al. | |
| 7,356,498 B2 | 4/2008 | Kaminsky et al. | |
| 7,356,500 B1 | 4/2008 | Waelbroeck et al. | |
| 7,401,044 B1 | 7/2008 | Fraser et al. | |
| 7,428,506 B2 | 9/2008 | Waelbroeck et al. | |
| 7,430,533 B1 | 9/2008 | Cushing | |
| 7,565,313 B2 | 7/2009 | Waelbroeck et al. | |
| 7,617,144 B2 | 11/2009 | Madoff et al. | |
| 2001/0027437 A1 | 10/2001 | Turbeville et al. | |
| 2002/0010672 A1 | 1/2002 | Waelbroeck et al. | |
| 2002/0026404 A1 | 2/2002 | Thompson | |
| 2002/0035534 A1 | 3/2002 | Buist et al. | |
| 2002/0046146 A1 | 4/2002 | Otero et al. | |
| 2002/0046149 A1 | 4/2002 | Otero et al. | |
| 2002/0046151 A1* | 4/2002 | Otero et al. | 705/37 |
| 2002/0049661 A1 | 4/2002 | Otero et al. | |
| 2002/0055901 A1 | 5/2002 | Gianakouros et al. | |
| 2002/0082967 A1 | 6/2002 | Kaminsky et al. | |
| 2002/0128945 A1 | 9/2002 | Moss et al. | |
| 2002/0133449 A1 | 9/2002 | Segal et al. | |
| 2002/0138390 A1 | 9/2002 | May | |
| 2002/0161687 A1 | 10/2002 | Serkin et al. | |
| 2003/0004859 A1 | 1/2003 | Shaw et al. | |
| 2003/0009411 A1 | 1/2003 | Ram et al. | |
| 2003/0018558 A1 | 1/2003 | Heffner et al. | |
| 2003/0069826 A1* | 4/2003 | Guidi et al. | 705/37 |
| 2003/0083973 A1 | 5/2003 | Horsfall | |
| 2003/0093343 A1 | 5/2003 | Huttenlocher et al. | |
| 2003/0167224 A1 | 9/2003 | Periwal | |
| 2004/0034591 A1 | 2/2004 | Waelbroeck et al. | |
| 2004/0059666 A1 | 3/2004 | Waelbroeck et al. | |
| 2004/0177024 A1 | 9/2004 | Bok et al. | |
| 2004/0193524 A1 | 9/2004 | Almeida et al. | |
| 2004/0210511 A1 | 10/2004 | Waelbroeck et al. | |
| 2004/0236669 A1 | 11/2004 | Horst et al. | |
| 2005/0004852 A1 | 1/2005 | Whitney | |
| 2005/0075963 A1 | 4/2005 | Balabon | |
| 2005/0234795 A1* | 10/2005 | Hodes et al. | 705/36 |
| 2006/0020538 A1 | 1/2006 | Ram et al. | |
| 2006/0080215 A1 | 4/2006 | Warsaw et al. | |
| 2006/0080219 A1 | 4/2006 | Lutnick et al. | |
| 2006/0206404 A1* | 9/2006 | Hatheway et al. | 705/37 |
| 2006/0259394 A1 | 11/2006 | Cushing et al. | |
| 2007/0038549 A1 | 2/2007 | Janowski et al. | |
| 2008/0109288 A1* | 5/2008 | Borkovec et al. | 705/7 |
| 2009/0076961 A1 | 3/2009 | Waelbroeck et al. | |
| 2009/0094151 A1* | 4/2009 | Mortimer et al. | 705/37 |
| 2010/0030720 A1 | 2/2010 | Stephens | |
| 2010/0082493 A1* | 4/2010 | Agrawal et al. | 705/71 |
| 2010/0153300 A1* | 6/2010 | Kolton et al. | 705/36 R |
| 2010/0299238 A1* | 11/2010 | Hecht | 705/37 |

FOREIGN PATENT DOCUMENTS

| | | |
|---|---|---|
| EP | 2024922 A2 | 2/2009 |
| GB | 2417576 A | 1/2006 |
| KR | 20010091523 A | 10/2001 |
| KR | 2002-0014286 A | 2/2002 |
| KR | 2005-0001121 A | 1/2005 |
| KR | 100591611 B1 | 6/2006 |
| WO | 00/77670 | 12/2000 |
| WO | 0117519 A1 | 3/2001 |
| WO | 01/61579 A1 | 8/2001 |
| WO | 0193169 A1 | 12/2001 |
| WO | 0238945 A1 | 5/2002 |
| WO | 03048905 A2 | 6/2003 |
| WO | 2005003894 A2 | 1/2005 |
| WO | 2007127041 A2 | 11/2007 |
| WO | 2007127857 A2 | 11/2007 |
| WO | 200871363 A2 | 6/2008 |
| WO | 2008071363 A2 | 6/2008 |
| WO | 2009015387 A2 | 1/2009 |
| WO | 2009015391 A2 | 1/2009 |
| WO | 2009039791 A1 | 4/2009 |
| WO | 2009046258 A2 | 4/2009 |
| WO | 2009059814 A2 | 5/2009 |
| WO | 2009126638 A2 | 10/2009 |
| WO | 2009126683 A2 | 10/2009 |

OTHER PUBLICATIONS

Domowitz I: "A Taxonomy of Automated Trade Execution systems", Journal of International Money and Finance of Butterworth Scientific, Guildford, GB, vol. 12, 1993, pp. 607-632.

J. D. Farmer and N. Zamani, "Mechanical vs. Informational Components of Price Impact," 2006; http://www.santafe.edu/research/publications/workingpapers/ 06-09-034.pdf; pp. 1-19.

Hendershott, T., "Electronic Trading in Financial Markets," IT Pro, Jul./Aug. 2003, pp. 10-14.

Clemons, E.K., et al.: "Restructuring Institutional Block Trading: An Overview of the Optimark System" System Sciences, 1998., Proceedings of the Thirty-First Hawaii International Conference on Kohala Coast, HI, USA Jan. 6-9, 1998, Los Alamitos, CA, USA, IEEE Comput. Soc., US, vol. 6, Jan. 6, 1998 (pp. 301-310) isbn: 0-8186-82555-8.

Weinhardt, C., et al., Agent-Mediated Off-Exchange Trading, Systems Sciences, 1999. HICSS-32., Proceeedings of the 32nd Annual Hawaii International Conference on Maui, HI, USA Jan. 5-8, 1999, Los Alamitos, CA, USA, IEEE Comput. Soc., US, Jan. 5, 1999, p. 6pp, ISBN: 0-7695-0001-3.

A Paper presented in Maastricht NL Aug. 2004: Harald A. Benik et al. "A Study of Neo-Austrian Economics using an Artificial Stock Market" pp. 1-41.

Artificial Life, vol. 4, No. 2, pp. 183-201: Christopher R. Stephens et al. "Self-Adaptation in Evolving Systems" (Spring 1998).

Jose L. Gordillo et al. "Analysis of Financial markets with the Artificial Agent-based Model—NNCP*" pp. 1-10 (ENC01 (INEGI), pp. 251-263 (2001).

Christopher R. Stephens et al. "Testing Efficiency in a Simulated Market using Excess Returns" pp. 1-17 (publication date unknown). Handbook of Marketing Research—Uses, Misuses, and Future Advances, eds Grover & Vriens (Sage Publications) Christopher R. Stephens et al. "An Introduction to Data Mining" pp. 1-39 (published Jun. 23, 2006).

(56) References Cited

OTHER PUBLICATIONS

Genetic Programming and Evolvable Machines, vol. 1, pp. 363-378, Christopher R. Stephens et al. "Effective Fitness as an Alternative Paradigm for Evolutionary Computation I: General Formalism" (Oct. 2001).

Genetic Programming and Evolvable Machines, vol. 2, pp. 7-32, Christopher R. Stephens et al. "Effective Fitness as an Alternative Paradigm for Evolutionary Computation II: Examples and Applications" (Mar. 2001).

U.S. Appl. No. 09/504,939, filed Feb. 16, 2000, Christopher R. Stephens.

* cited by examiner

METHOD AND APPARATUS FOR IMPROVED ELECTRONIC TRADING

PRIOR APPLICATION

This application claims the benefit of priority to U.S. Provisional Patent Application No. 60/977,710, filed Oct. 5, 2007, the entire contents of which are hereby incorporated by reference in their entirety.

BRIEF DESCRIPTION

1. Technical Field

The present invention is related to electronic trading and, more particularly, to electronic trading of equity derivatives.

2. Background

An equity derivative is a class of financial instruments whose value is derived in part from one or more underlying equity securities. Options are a common type of equity derivatives. An option purchaser obtains the right, but not the obligation, to engage in a future transaction on some underlying security. The option seller collects a premium and is obligated to perform if the holder exercises his right under the option contract.

Generally, there are two types of options: call options and put options. A call option provides the option holder the right to buy an agreed quantity of a particular security from a seller at a certain time for a set price. In contrast, a put option provides the holder with the right to sell an agreed quantity of a particular security to the seller at a certain time for a set price. The seller has the obligation to purchase the underlying security at that price, if the holder exercises the option.

When securities are traded, a trader will generally receive a request or "order" to buy or sell a number of shares of the security, and the trader will then execute the trade in the appropriate market or markets. Orders that occur between institutional parties are called "block" trades. A block equity trade is for 250,000 shares or more and a block equity option trade is for at least 500 contracts. However, the average execution size in the markets for these securities is substantially smaller than "block" size. The average equity execution is between 300 and 200 shares and the average equity option execution is between 20 and 10 contracts. In some cases, orders often cannot be executed in a single transaction between one buyer or seller and must be executed as multiple transactions and at multiple prices often spread out over a period of time.

Many equity traders use a Volume Weighted Average Price (VWAP) benchmark to evaluate how well a trade is executed. VWAP is the average of the price of every trade, weighted by the size of the trade over a period of time. In layman's terms, VWAP defines a fair price—what the market, as a whole, paid, as an average. In recent years, the use of VWAP in the equities markets has developed further, and traders can achieve a VWAP price through a variety of mechanisms: many broker-dealers offer guaranteed VWAP pricing to their clients; there are systems, algorithms and firms available that target VWAP on an agency basis; and there are products, such as Instinet's VWAP cross, that are designed for bringing together block trades at a fair price. These trades are forward-priced, meaning that when the trade is agreed to, the price is unknown—it must be determined later. At the end of the VWAP interval, when the price can be calculated, the trade is reported through any number of regulated channels. This type of order is generally known as a "benchmark order."

Because of the way VWAP trades are priced, the execution price of a VWAP trade is likely to be different from the price that is available in the market at the time the trade is reported. Because of this discrepancy between the VWAP price and the current price and because of the accepted fairness of the forward-pricing mechanism, the rules and regulations governing the trading of equity securities trading clearly allow for these sorts of execution mechanisms.

Though VWAP is common in the equities market, it is not used in the equity derivatives market. The many reasons for this include: 1) the fact that derivatives often do not trade consistently throughout the day. They are "chunkier" and more random in occurrence, therefore there are fewer relevant price points to use in determining a VWAP price; 2) much of the derivatives volume is done in multi-leg trades—spreads and other complex orders—where one derivative's contingent trading price is based on the price of another asset with simultaneous contingent execution. These trades must be priced to fit inside the current available and displayed prices (at or between the National Best Bid and Offer or NBBO), but do not necessarily reflect the accurate price of each individual option series; and 3) most importantly, there exists no mechanism today to report, to or through the derivatives exchanges, a VWAP (or any other forward-priced) trade. Today all listed equity option trades must take place on an exchange and must be at or between the best available prices on all exchanges (NBBO), therefore an average priced trade may not take place.

Accordingly, there is a need for improved systems and methods for exchange-traded equity derivatives.

BRIEF SUMMARY

Consistent with the present invention, there is provided a computer-readable storage medium having instructions which, when executed on a processor, perform a method for generating a benchmark price for an exchange-traded equity derivatives order, the method comprising: receiving a first delta value, a gamma value, a value-weighted average price value of an underlying stock, a reference price value of the underlying stock, and an original order premium value; where the first delta value is a measure of the rate of change in a theoretical value of an option for a one-unit change in the price of the underlying stock; the gamma value is a measure of the rate of change in a delta of an option for a one-unit change in the price of the underlying stock; and the original order premium value is an agreed value; calculating a master rate of change value based on the value-weighted average price and reference price values; calculating an adjusted delta value based on the first delta value, the master rate of change value, and the gamma value; calculating a gamma-weighted average price value based on the original order premium value, the master rate of change value, and the adjusted delta value; and outputting the gamma-weighted average price value as a benchmark price for the order.

Consistent with the present invention, there is provided an apparatus for generating a benchmark trading price for an exchange-traded equity derivatives order, comprising: an input module for receiving input values, the input values comprising a first delta value, a gamma value, a value-weighted average price value of an underlying stock, a reference price value of the underlying stock, and an original order premium value; where: the first delta value is a measure of the rate of change in an option's theoretical value for a one-unit change in the price of the underlying stock; the gamma value is a measure of the rate of change in an option's delta for a one-unit change in the price of the underlying stock; and the original order premium value is a value set for the order with corresponding values based on the first delta value, gamma value, and reference price value; a processor for performing calculations, including: calculating a master rate of change value based on the value-weighted average price and the reference price values; calculating an adjusted delta value based on the first delta value, the master rate of change value, and the gamma value; and calculating a gamma-weighted average price value based on the original order premium value, the master rate of change value, and the adjusted delta value; and an output module for outputting the gamma-weighted average price value as a benchmark trading price for the order.

Consistent with the present invention, there is provided a computer-readable storage medium having instructions which, when executed by a processor, perform a method for matching pre-open orders using a gamma-weighted average price, the method comprising: receiving pre-open orders from a trader during a first time period, the pre-open orders including a seller amount and price or a buyer amount and price; storing the pre-open orders in an order module; matching the pre-open orders during a second time period that begins after the first time period ends, the orders being matched when the seller amount and price of a pre-open order matches the buyer amount and price of a pre-open order; receiving market data during a third time period that begins after the second time period ends; calculating a gamma-weighted average price value based on the received market data, the gamma-weighted average price being based on an original order premium value, a master rate of change value, and an adjusted delta value; and outputting the gamma-weighted average price value as an estimate of a trading price for the order.

Consistent with the present invention, there is provided an apparatus for conducting forward-price trades in the equity derivatives market, the apparatus comprising: a communications module for receiving pre-open orders from a trader during a first time period, the pre-open orders including a seller amount and price or a buyer amount and price; an order module for storing the pre-open orders; a matching module for matching the pre-open orders during a second time period that begins after the first time period ends, the pre-open orders being matched when the seller amount and price of a pre-open order matches the buyer amount and price of a pre-open order; an input module for receiving market data during a third time period that begins after the second time period ends; a calculation module for calculating a gamma-weighted average price based on the received market data, the gamma-weighted average price being based on an original order premium value, a master rate of change value, and an adjusted delta value; and a display module for outputting the gamma-weighted average price a benchmark price for the order.

Consistent with the present invention, there is provided a computer-readable storage medium having instructions which, when executed on a processor, perform a method for calculating the level of trading interest of derivative instruments at a gamma-weighted average price and incremental prices around the gamma-weighted average price, the method comprising: receiving pre-open orders from a trader during a first time period, each pre-open order including (1) a seller amount value at a gamma-weighted average price value or a second price value, or (2) a buyer amount value at the gamma-weighted average price value or the second price value; calculating the level of buyer trading interest at the gamma-weighted average price value by adding the buyer amount value in each pre-open order at the gamma-weighted average price value; calculating the level of buyer trading interest at the second price value by adding the buyer amount value in each pre-open order at the second price value; calculating the level of seller trading interest at the gamma-weighted average price value by adding the buyer amount value in each pre-open order at the gamma-weighted average price value; calculating the level of seller trading interest at the second price value by adding the buyer amount value in each pre-open order at the second price value; and outputting values representing the level of buyer trading interest at the gamma-weighted average price value, the level of buyer trading interest at the second price value, the level of seller trading interest at the gamma-weighted average price value, and the level of buyer trading interest at the second price value.

It is to be understood that both the foregoing general description and the following detailed description are exemplary and explanatory only and are not restrictive of the invention, as claimed.

The accompanying drawings, which are incorporated in and constitute a part of this specification, illustrate embodiments consistent with the invention and together with the description, serve to explain the principles of the invention.

DETAILED DESCRIPTION

Reference will now be made in detail to the exemplary embodiments consistent with the present invention, an example of which is illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Embodiments of the present invention may include a Gamma-weighted Options Pricing (GWAP) methodology that brings to the exchange traded equity derivatives market a benchmark that can be used the way VWAP is used in the equities market. Using a Convexity Measurement (Gamma) in an equation where the VWAP of the underlying security (stock, index, or the like) can be calculated, the GWAP factor may accurately and equitably estimate the change in value of the options premium that would have resulted if the options traded in a direct linear volume relationship with its underlying security.

Figure 1:
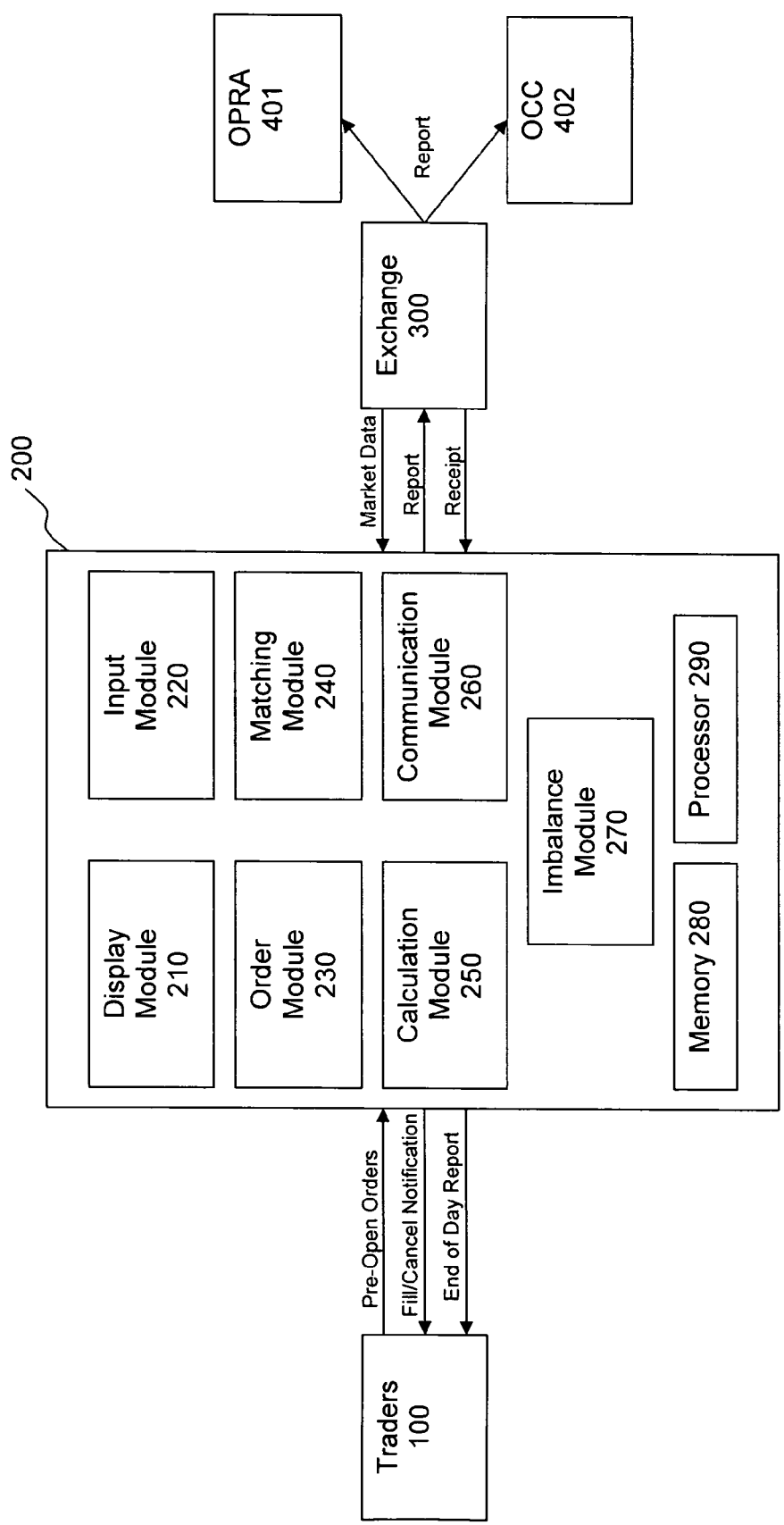
FIG. 1 is a data flow diagram consistent with an exemplary embodiment of the present invention.

FIG. 1 is a data flow diagram of an exemplary embodiment consistent with the invention. As shown in FIG. 1, a GWAP system 200 may include a display module 210, an input module 220, an order module 230, a matching module 240, a calculation module 250, a communication module 260, an imbalance module 270, a memory 280, and a processor 290.

Traders 100 can submit pre-open orders to the GWAP system 200 during an order entry period via communication module 260. The communication module 260 may communicate using the Financial Information eXchange (FIX) protocol or any other acceptable electronic communications protocol for the exchange of information. The pre-open orders can include one or more pieces of information such as, for example, a trader's interest in executing a trade at the GWAP price and/or incremental prices around the GWAP price. These pre-open orders are received by the GWAP system 200 and are maintained in order module 230 until the order entry period expires and orders are matched by matching module 240 during a matching period. In addition, the imbalance module 270 of the GWAP system 200 may use the pre-open orders to calculate the level of trading interest of derivative instruments at the GWAP price and incremental prices around the GWAP price, and report that interest through the communication module 260 to, for example, the traders 100, in the event that the traders 100 want to modify their pre-open orders. However, during the matching period no new orders are accepted and no order modification may take place.

During the matching period, the matching module 240 calculates the maximum match quantity and pairs off, or matches, pre-open orders to achieve the maximum match quantity. For example, buyers who want to buy x number of contracts of a security at GWAP are matched with sellers who want to sell x number of contracts of a security at GWAP. In addition, the matching module 240 may also use a priority system to match pre-open orders if there are multiple pre-open orders that could be filled to achieve an optimum match quantity. For example, pre-open orders in the same series may be ranked using size priority, and pre-open orders in the same series that are the same size may be ranked using time priority.

After the pre-open orders have been matched and the matching period has expired, the traders 100 who submitted orders may receive match confirmations that their order has been filled. Unmatched orders or any unmatched portion of an order will be cancelled, and cancel notifications may be transmitted to the trader 100 whose order was not filled. The communications module 260 is responsible for distributing order confirmation and/or cancellation notifications. Generally, both the order entry period and the matching period begin and conclude before the market opens for trading. Thus, following the matching period, the market opens and executes trades which determine the data used to calculate the GWAP execution price.

After the conclusion of trading, the input module 220 may receive input values from, for example, an exchange 300. These input values can include, but are not limited to, public market data obtained during the trading day (as discussed above) including a delta value, a gamma value, a value-weighted average price of an underlying stock, a reference price of the underlying stock, and an order original premium value. The input module 220 may transmit the input values to the calculation module 250, which in turn uses the input values to calculate the GWAP execution price as discussed in more detail below.

Subsequently, a communication module 260 of the GWAP system 200 may report the GWAP trades to an exchange or SRO 300, such as the Chicago Board of Options Exchange (CBOE), and through the exchange or SRO to the public and other required industry dissemination services such as, for example, the Options Price Reporting Authority (OPRA) 401 and the Options Clearing Corporation (OCC) 402. The exchange or SRO 300 may also send an acknowledgement of receipt of the report of the GWAP trades. In addition, the communication module 260 may transmit the GWAP execution price to a number of individuals or entities, including the traders 100 who submitted orders, and preferably only to the traders 100 who submitted orders that were filled or partially filled. Furthermore, the GWAP system 200 may include a display module 210 that can display the GWAP execution price and/or well as the trades that occurred at the GWAP price and incremental prices around the GWAP price.

Figure 2:
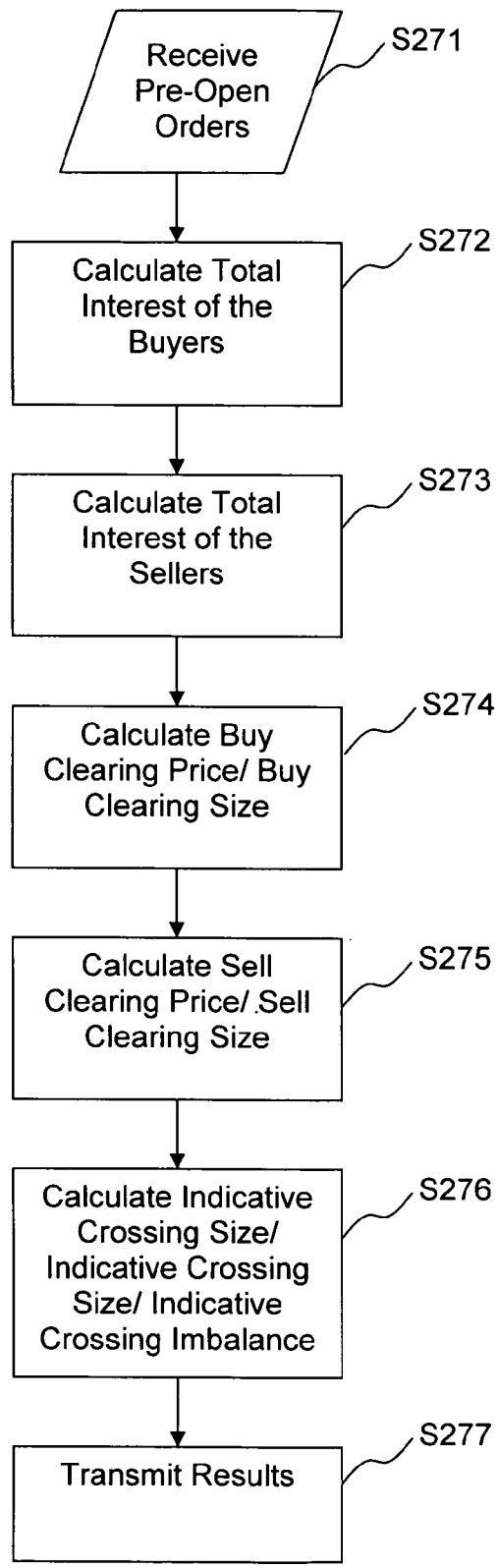
FIG. 2 is flow diagram showing an exemplary operation of an imbalance module.

FIG. 2 is flow-chart demonstrating an exemplary method used by the imbalance module 270 to calculate the level of trading interest of derivative instruments at the GWAP price and incremental prices around the GWAP price. After receiving the pre-open orders S271 for price points, the imbalance module 270 may calculate the total interest of the buyers S272 and/or the sellers S273. In addition, the imbalance module may calculate the buy clearing price and/or the buy clearing size S274, the sell clearing price and/or the sell clearing price S275, and/or the indicative crossing price, indicative crossing size, and/or indicative price imbalance S276. After one or more of the above calculations are complete, the imbalance module 270 may transmit one or more of the results of these calculations S277 through the communications module 260 of the GWAP system 200.

Figure 3:
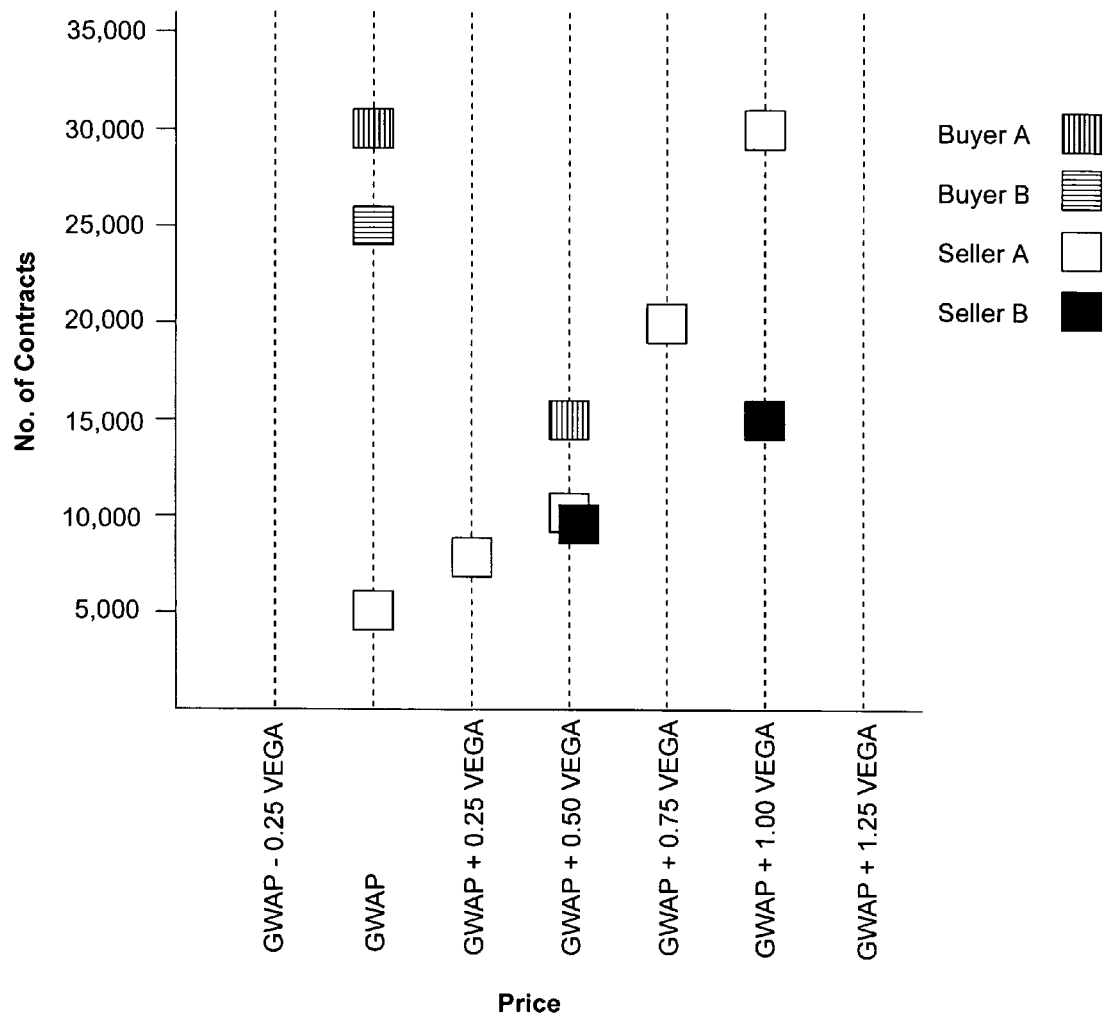
FIG. 3 is a graphical depiction of an example illustrative of calculations of the imbalance module depicted in FIG. 2.

FIG. 3 is a graphical depiction of an example illustrative of calculations of the imbalance module 270 as depicted in FIG. 2. As shown in FIG. 3, Buyer A is willing to buy 30,000 contracts at GWAP or 15,000 contracts at GWAP+0.50 VEGA[1] while Buyer B is only willing to buy 25,000 contracts at GWAP. Conversely, Seller A is willing to sell 30,000 contracts at GWAP+1.00, 20,000 contracts at GWAP+0.75 VEGA, 10,000 contracts at GWAP+0.50 VEGA, 7,500 contracts at GWAP+0.25 VEGA, or 5,000 contracts at GWAP. In addition, Seller B is willing to sell 15,000 contracts at GWAP+1.00 VEGA or 10,000 contracts at GWAP+0.50 VEGA. There are no buyers or sellers at GWAP−0.25 VEGA or GWAP+1.25 VEGA.

[1]VEGA is a derivative of the option value with respect to the volatility of the underlying option.

The imbalance module 270 calculates the interests of the buyers and sellers at the GWAP price and the incremental prices around the GWAP price, the results of which are shown in Table 1 below.

TABLE 1

| Price Point | Total Contracts (Sellers) | Total Contracts (Buyers) |
| --- | --- | --- |
| GWAP − 0.25 VEGA | 0 | 0 |
| GWAP | 5,000 | 55,000 |
| GWAP + 0.25 VEGA | 7,500 | 0 |
| GWAP + 0.50 VEGA | 20,000 | 15,000 |
| GWAP + 0.75 VEGA | 20,000 | 0 |
| GWAP + 1.0 VEGA | 45,000 | 0 |

In this case, the interest of the buyers at the GWAP price is 55,000 contracts (Buyer A's interest of 30,000 contracts at GWAP+Buyer B's interest in 25,000 contracts at GWAP) and the interest of the sellers at the GWAP price is 5,000 contracts (Seller A's interest of 5,000 contracts at GWAP+Seller B's interest of 0 contracts at GWAP). Additionally, the interest of the buyers at the GWAP+0.25 VEGA is 0 contracts (Buyer A's interest of 0 contracts at GWAP+0.25 VEGA+Buyer B's interest of 0 contracts at GWAP+0.25 VEGA) while the interest of the sellers at GWAP+0.25 VEGA is 5,000 contracts (Sellers A's interest of 5,000 contracts at GWAP+0.25 VEGA+Seller B's interest of 0 contracts at GWAP+0.25 VEGA).

In addition to calculating the interest of the buyers and the sellers, the imbalance module 270 may calculate the clearing prices and sizes (i.e. the maximum number of buys or sells at GWAP or at each incremental price around GWAP if each order was filled). In this example, the maximum number of buys occurs at GWAP because if each order was filled there would be 55,000 contracts as opposed to only 15,000 contracts at GWAP+0.50. Thus, the buy clearing price is GWAP and the buy clearing size is 55,000. Conversely, the maximum number of sells occurs at GWAP+1.00 because if each order was filled there would be 45,000 contracts.

The imbalance module 270 may also calculate the indicative crossing price and size, as well as the indicative price imbalance. Here, there are no sellers or buyers at GWAP−0.25 VEGA, and there are no buyers at GWAP+0.25 VEGA or GWAP+0.75 VEGA. Thus, in this example, if the buyers and sellers were matched, the maximum number of orders would be filled at GWAP+0.50 VEGA and the number of orders filled would be 15,000, leaving sellers with an additional 5,000 contracts that they were willing, but were unable to sell. Thus, the indicative crossing price in this example is GWAP+ 0.50 VEGA, the indicative crossing size is 15,000 and the indicative price imbalance is 5,000 to sell.

While the pricing increments described herein and shown in FIG. 3 are relative increments, such as ±0.5 VEGA, the pricing increments may be absolute increments such as ±0.5 and may be any number or fraction thereof.

Figure 4:
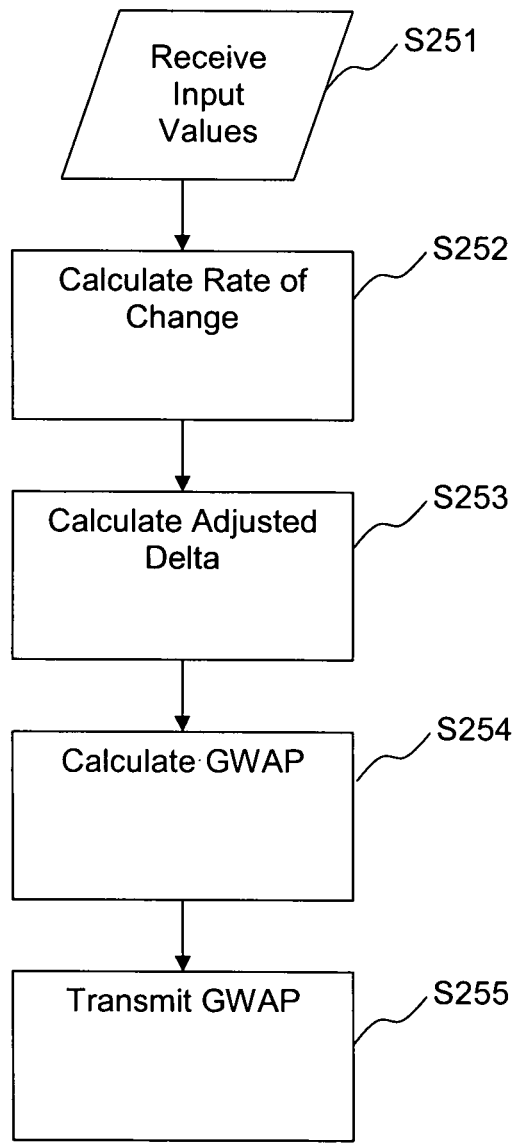
FIG. 4 is a flow diagram showing an exemplary operation of a calculation module.

FIG. 4 is a flow diagram showing an exemplary operation of the calculation module 250. The calculation module 250 receives the input values S251 and may calculate the Rate of Change S252 by subtracting the Stock Reference from the VWAP of the underlying stock, as represented by equation (1)

$$\text{Rate of Change}=\text{VWAP of the Underlying Stock}-\text{Stock Reference} \quad (1)$$

As shown in FIG. 4, the calculation module 250 may also calculate the Adjusted Delta S253 by adding or subtracting (for calls and puts, respectively) the Rate of Change multiplied by the Gamma of the options contract to/from the Delta of the option contract, as represented by equations (2) and (3):

$$\text{Adjusted Delta}=\text{Delta}+(\text{Rate of Change}\times\text{Gamma})\text{ for call options} \quad (2)$$

$$\text{Adjusted Delta}=\text{Delta}-(\text{Rate of Change}\times\text{Gamma})\text{ for put options} \quad (3)$$

The calculation module 250 may also calculate the GWAP S254 by adding (for call options) or subtracting (for put options) the Rate of Change of the underlying stock multiplied by an Adjusted Delta to/from the Original Order Premium, as represented by equations (4) and (5):

$$\text{GWAP}=\text{Original Order Premium}+(\text{Rate of Change}\times\text{Adjusted Delta})\text{ for call options} \quad (4)$$

$$\text{GWAP}=\text{Original Order Premium}-(\text{Rate of Change}\times\text{Adjusted Delta})\text{ for put options} \quad (5)$$

The Original Order Premium may be an input value set by the pre-sale order with corresponding values based on the First Delta, Gamma, and the Stock Reference, where First Delta is a measure of the rate of change in an option's theoretical value for a one-unit change in the price of the underlying stock, Gamma is a measure of the rate of change in an option's First Delta for a one-unit change in the price of the underlying stock, and the Stock Reference is the actual last trade of the underlying stock and/or the price of the stock at the time of order arrival.

After calculating the GWAP, the calculation module may transmit the results of the GWAP calculation to the communication module 260.

The GWAP above is calculated using a straight delta-adjusted formula. However, variations of the GWAP formula and trading process can be used such as a second-order Taylor expansion version, or any similar n-order variation that smooths an option price over a period of time based on the delta, gamma, and VWAP of the underlying security. For example, assuming that the First Delta of call options is positive and the First Delta of put options is negative, the GWAP may be calculated using equation 6.

$$\text{GWAP}=\text{Original Order Premium}+(\text{First Delta}\times\text{Rate of Change})+0.5\times(\text{Gamma}\times(\text{Rate of Change})^2) \quad (6)$$

The following example is illustrative of a calculation using an exemplary formula of an embodiment of present invention:

Example 2

A customer sells 10,000 contracts of XYZ at the GWAP, a price to be determined later. The following criteria are used to compute the GWAP.
When
First Delta=30%
Gamma=6%
Original Order Premium=2.00
Stock Reference=$130.50
VWAP=131.26
The calculations are as follows:

$$\text{GWAP}=\text{Original Order Premium}+(\text{First Delta}\times\text{Rate of Change})+0.5\times(\text{Gamma}\times(\text{Rate of Change})^2)$$

$$\text{VWAP}-\text{Stock Reference}=\text{Rate of Change}$$

$$131.26-130.5=0.76$$

$$\text{GWAP}=2.00+(0.30\times0.76)+0.5\times(0.06\times(0.76)^2)$$

$$\text{GWAP}=2.00+0.228+0.017$$

$$\text{GWAP}=2.245$$

The calculations completed by the imbalance module 270 and the calculation module 240 are only exemplary, and the imbalance module 270 need not complete each and every one of those calculations in order to calculate the level of trading interest of derivative instruments and the calculation module 240 need not complete each and every one of the calculations to calculate the GWAP price. Indeed, the calculation module 240 and the imbalance module 270 may complete more or less calculations than those described above. Furthermore, the order of the calculations discussed above are not limited to the exemplary orders shown in FIGS. 2 and 4.

Figure 5:
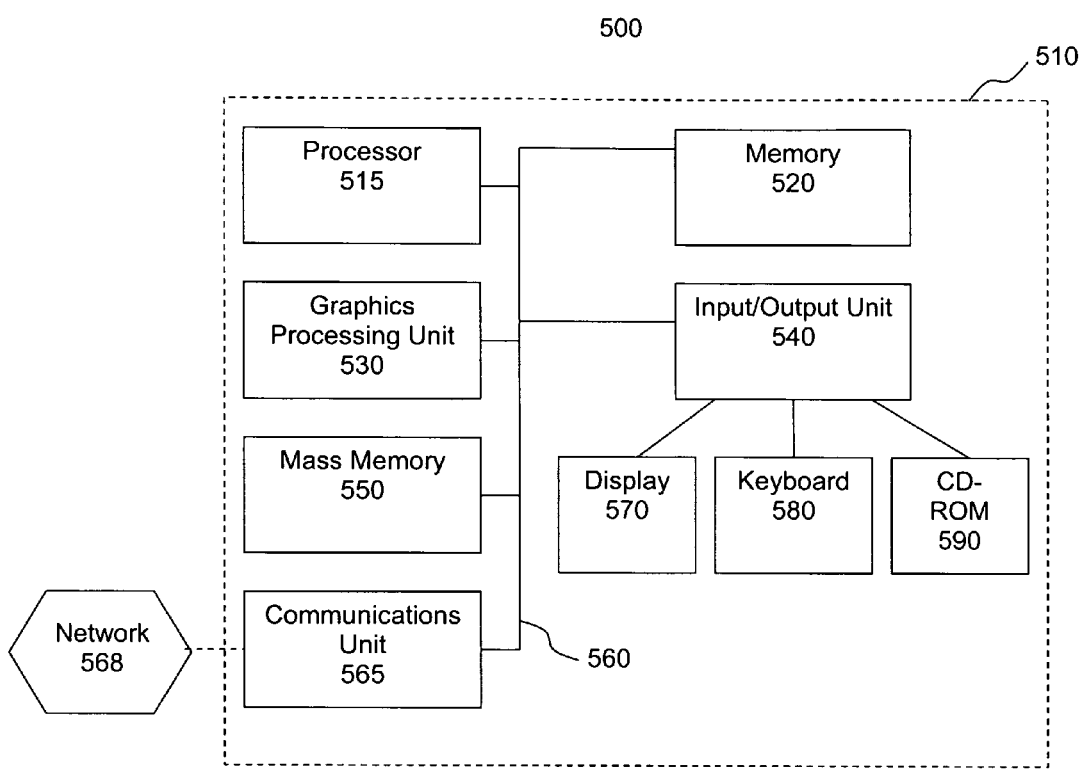
FIG. 5 is a diagram of an exemplary embodiment of a computer system that may implement the embodiments of the present invention.

Referring now to FIG. 5, exemplary embodiments consistent with the invention may be implemented on a computer system 500. Computer system 500 may comprise a computer 510, a memory 520, a graphics processing unit 530, an input/output unit 540, and a mass memory unit 550, such as a hard disk, interconnected by a bus 560. Computer system 500 may further include communications unit 565 for connection to a network 568 such as a LAN or the Internet; a display unit 570, such as a liquid crystal display (LCD); and one or more input devices, such as a keyboard 580 and CD-ROM drive 590 for reading a computer-readable medium which is encoded with instructions. The instructions may then be read into memory 280, thereby forming modules 210, 220, 230, 240, 250, 260, and 270. When the instructions are executed by processor 510, the computer system 500 may perform the methods described above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. For example, while in this exemplary embodiment, the GWAP system 200 includes a single memory and processor, multiple processors and memories could be used. As another example, each module can communicate with the traders 100, the exchange 300, and the like themselves without requiring a transmission to the communication module 260.

What is claimed is:

1. A non-transitory computer-readable storage medium having instructions which, when executed on a processor, perform a method for generating a benchmark price for an option order, the method comprising:
   receiving a first delta value, a gamma value, a volume-weighted average price value of an underlying stock of the option, a reference price value of the underlying stock, and an original order premium value;
      where the first delta value is a measure of rate of change in the value of the option for a one-unit change in the price of the underlying stock;
      the gamma value is a measure of rate of change in the first delta value for a one-unit change in the price of the underlying stock;
      the reference price value of the underlying stock is a recent price of the underlying stock of the option; and
      the original order premium value is set for an order interval;
   calculating a rate of change value based on the volume-weighted average price and reference price values;
   calculating an adjusted delta value by multiplying the rate of change value by the gamma value, and adding the first delta value;
   calculating a gamma-weighted average price value by multiplying the first delta value by the rate of change value to achieve a first product, squaring the rate of change value and multiplying the squared rate of change value by the gamma value to achieve a second product, and adding the first product and ½ of the second product to the original order premium value;
   calculating a benchmark price for the option order based on the gamma-weighted average price value; and
   outputting the benchmark price for the option order;
   wherein the gamma-weighted average price value is calculated by multiplying the first delta value by the rate of change value to achieve a first product, squaring the rate of change value and multiplying the squared rate of change value by the gamma value to achieve a second product, and adding the first product and ½ of the second product to the original order premium value.

2. The non-transitory computer-readable storage medium according to claim 1, wherein the rate of change value is calculated by subtracting the reference price value from the volume-weighted average price value.

3. The non-transitory computer-readable storage medium according to claim 1, wherein the adjusted delta value is calculated by multiplying the rate of change value by the gamma value, and adding the first delta value.

4. The non-transitory computer-readable storage medium according to claim 1, wherein the gamma-weighted average price value is calculated by multiplying the rate of change value by the adjusted delta value, and adding the original order premium value.

5. The non-transitory computer readable storage medium of claim 1, wherein said original order premium value is a price originally paid for the option.

6. The non-transitory computer readable storage medium of claim 1, wherein said original order premium value is a most recently reported price for the option.

7. The non-transitory computer readable storage medium of claim 1, wherein said original order premium value is a price based on a bid-offer spread.

8. The non-transitory computer-readable storage medium according to claim 1, wherein the gamma-weighted average price value is calculated by multiplying the rate of change value by the adjusted delta value to obtain a product value, and subtracting the product value from the original order premium value.

9. An apparatus for generating a benchmark trading price for an option-order, comprising:
   an input module for receiving electronically input values for said option from an options exchange via a network, the input values comprising a first delta value, a gamma value, a volume-weighted average price value of an underlying stock of the option, a reference price value of the underlying stock, and an original order premium value;
      where the first delta value is a measure of rate of change in the value of the option for a one-unit change in the price of the underlying stock;
      the gamma value is a measure of rate of change in the first delta value for a one-unit change in the price of the underlying stock;
      the reference price value of the underlying stock is a recent price of the underlying stock of the option; and
      the original order premium value is set for an order interval;
   a processor connected to the input module for:
   calculating a rate of change value based on the volume-weighted average price and the reference price values;
   calculating an adjusted delta value by multiplying the rate of change value by the gamma value, and adding the first delta value; and
   calculating a gamma-weighted average price value by multiplying the first delta value by the rate of change value to achieve a first product, squaring the rate of change value and multiplying the squared rate of change value by the gamma value to achieve a second product, an adding the first product and ½ of the second product to the original order premium value;
   calculating a benchmark trading price for the option order based on said gamma-weighted average price value; and
   an output module connected to the processor for outputting said benchmark trading price for the option order;
   wherein the gamma-weighted average price value is calculated by multiplying the first delta value by the rate of change value to achieve a first product, squaring the rate of change value and multiplying the squared rate of change value by the gamma value to achieve a second product, an adding the first product and ½ of the second product to the original order premium value.

10. The apparatus according to claim 9, wherein the rate of change value is calculated by subtracting the reference price value from the value-weighted average price value.

11. The apparatus according to claim 9, wherein the adjusted delta value is calculated by multiplying the rate of change value by the gamma value, and adding the first delta value.

12. The apparatus according to claim 9, wherein the gamma-weighted average price value is calculated by multiplying the rate of change value by the adjusted delta value, and adding the original order premium value.

13. The apparatus of claim 9, wherein the original order premium value is a price originally paid for the option.

14. The apparatus of claim 9, wherein the original order premium value is a most recently reported price for the option.

15. The apparatus of claim 9, wherein the original order premium value is a price based on a bid-offer spread.

16. The apparatus of claim 9, wherein the gamma-weighted average price value is calculated by multiplying the rate of change value by the adjusted delta value to obtain a product value, and subtracting the product value from the original order premium value.

* * * * *